Patented Dec. 3, 1935

2,023,191

UNITED STATES PATENT OFFICE 2,023,191

ABRASIVE

Gerhard Balle and Franz Grom, Frankfort-on-the-Main, and Karl Wolf, Oggersheim, Germany, assignors to I. G. Farbenindustrie Aktiengesellschaft, Frankfort-on-the-Main, Germany No Drawing. Application August 2, 1934, Serial No. 738.156. In Germany August 12, 1933

8 Claims. (Cl. 51—280)

The present invention relates to abrasives, more particularly to emery paper.

We have found that condensation products from maleic acid or maleic anhydride on the one hand with organic compounds corresponding to the general formula $R_1$—CHOH—X—$R_2$ wherein X stands for one of the groups —$CH_2$—CHOH—, —CH.alkyl—CHOH— or $CH_2$—CH=CH—, $R_1$ stands for hydrogen or an aliphatic hydrocarbon radical, $R_2$ stands for hydrogen or an aliphatic ester residue, $R_1$ and $R_2$ being interchangeable, on the other hand are suitable as binding agents for the manufacture of abrasives of all kinds. In the primary phase of the condensation, these condensation products are more or less highly viscous oils which, when heated to temperatures of about 80° C. to 140° C., if desired with addition of catalysts, are converted into elastic and extremely solid products. Due to their fastness to water, their high elasticity, their high viscosity and resistance, these products are excellently suitable as binding agents for all abrasives, especially for the manufacture of emery paper.

Emery paper is made as follows: either the primary condensation product from maleic acid and one of the above defined organic compounds directly or dissolved in an organic solvent, is applied in the form of a thin layer on paper; after the evaporation of the solvent the paper is strewed with any abrasive, for instance silicon carbide, garnet, electrocorundum, quartz, glass, flint or the like; or the abrasive in question is mixed with the solution of the condensation product and this mixture is applied on the paper by a suitable laying-on device. In either case, as soon as the abradant has been applied, the papers are heated in a drying device, the binding agent being thus condensed to form insoluble, elastic final products.

As these products have good mechanical properties and are distinguished particularly by an extraordinary flexibility and elasticity, they are suitable for being used in admixture with likewise very resistant, but brittle products, such as phenol-aldehyde condensation products or urea-aldehyde condensation products or other natural resins or artificial resins, for instance colophony or the condensation products thereof with maleic acid. By a suitable selection of the mixing ratio any desired degree of elasticity or hardness may be adjusted.

The following examples serve to illustrate the invention, but they are not intended to limit it thereto, the parts being by weights—

(1) A solution of 40 per cent. strength of a condensation product from castor oil and maleic acid in toluene is applied on a web; the solvent is caused to evaporate, the web is strewed with grains of silicon-carbide, then heated until the grains have sunk in and finally hardened for 15 hours at 130° C. If the solution is mixed with 2 per cent. of benzoyl peroxide or 1 per cent. of monomeric styrene, the period of hardening may be shortened.

If, instead of a solution of the condensation product from castor oil and maleic acid there is used the corresponding solution of a condensation product from castor oil (which has been made soluble in mineral oils by heating in the presence of a catalyst capable of splitting off water according to U. S. Patent No. 1,892,258) and maleic acid, the period of hardening may be reduced to about 4 to 5 hours without using a catalyst; there are obtained papers having an increased fastness and resistance to water. With the same success there may be used condensation products from blown castor oil and maleic acid or maleic anhydride.

(2) There is applied on a paper web a mixture of equal parts of a solution of 30 per cent. strength of a condensation product from castor oil and maleic acid and a solution of 50 per cent. strength of a condensation product from linseed oil, urea and formaldehyde in benzene prepared as described in U. S. Patent application Serial No. 661,572 filed on March 18, 1933 in the name of Karl Eisenmann, Erich Scholz and Karl Wolf. The further treatment is the same as described in Example 1.

Instead of the condensation product from linseed oil, urea and formaldehyde, there may be used the esters capable of being hardened from the condensation products of tetrahydronaphthols and aldehydes with higher fatty acids, also mixed esters of polyhydric alcohols which are esterified partly with fatty acids and partly with the synthetic resin acids obtainable according to U. S. Patent application Serial No. 516,213 filed February 16, 1931 in the name of Krzikalla and Wolf, and, if desired, further polybasic carboxylic acids; furthermore, products of boiling a copal or dammar resin with linseed oil or wood oil are suitable.

In this case the compounds have to be prepared if possible in such a manner that their viscosity in the undiluted condition corresponds with that of stand oils which will just flow (sirupy consistency). The concentration of the solution will be comparatively low or comparatively high to suit the method of applying the solution (by means of a spraying piston or a roller)

and the rapidity of the operation. The concentrations generally lie between 15 and 60 per cent; they may, however, also be higher, in case heated solutions are used. The ratio of the components to one another may be varied within wide limits.

(3) A cardboard disc is impregnated with wood oil. After drying, one of the surfaces is roughened and there is applied thereon an acetone solution containing 40 per cent. of a condensation product from castor oil and maleic acid and 10 per cent. colophony. After the solvent has evaporated, coarse grains of aluminium oxide (No. 40) are strewed thereon. A layer of the same binding agent is then again applied. The layer is hardened by heating it for 10 hours to 135° C.

Instead of the condensation product from 1.3-butylene glycol and maleic anhydride there may be used a condensation product from 2-ethyl-hexandiol 1-3 and maleic anhydried.

(4) A solution of 45 per cent. strength of a condensation product from castor oil and maleic butyl ester acid is applied on a paper web. After the solvent has evaporated the web is further treated as described in Example 1.

We claim:

1. The article of manufacture comprising a grit or layer of abrasive particles and an adhesive bond for uniting the abrasive particles to form a coherent mass or layer, said bond including a hardened condensation product of maleic acid including its anhydride with castor oil.

2. The article of manufacture comprising a grit or layer of abrasive particles and an adhesive bond for uniting the abrasive particles to form a coherent mass or layer, said bond including a hardened condensation product of maleic acid including its anhydride with blown castor oil.

3. The article of manufacture comprising a grit or layer of abrasive particles and an adhesive bond for uniting the abrasive particles to form a coherent mass or layer, said bond including a hardened condensation product of maleic acid including its anhydride with castor oil in the molecule of which water has been split off.

4. The article of manufacture comprising a grit or layer of abrasive particles and an adhesive bond for uniting the abrasive particles to form a coherent mass or layer, said bond including a hardened condensation product of maleic acid including its anhydride with castor oil, which has been thickened by heating it.

5. An article of manufacture comprising a flexible sheet material, a coating thereon comprising an abrasive material and a condensation product of maleic acid including its anhydride with castor oil.

6. An article of manufacture comprising a flexible sheet material, a coating thereon comprising an abrasive material and a condensation product of maleic acid including its anhydride with blown castor oil.

7. An article of manufacture comprising a flexible sheet material, a coating thereon comprising an abrasive material and a condensation product of maleic acid including its anhydride with castor oil in the molecule of which water has been split off.

8. An article of manufacture comprising a flexible sheet material, a coating thereon comprising an abrasive material and a condensation product of maleic acid including its anhydride with castor oil which has been thickened by heating it.

GERHARD BALLE.
FRANZ GROM.
KARL WOLF.